3,032,546
YELLOW AZO PIGMENT
Roger A. Johnson, Union, N.J., assignor to E. I. du Pont de Nemours and Company, Wilmington, Del., a corporation of Delaware
No Drawing. Filed Aug. 24, 1959, Ser. No. 835,456
1 Claim. (Cl. 260—193)

This invention relates to the preparation of a new yellow pigment and more particularly refers to the preparation of a new azo yellow pigment which exhibits unexpected color strength and unusually good light-fastness.

This application is a continuation-in-part of my prior copending application Serial No. 697,540, filed November 20, 1957, now abandoned.

The art of preparing yellow azo pigments by coupling diazotized amines with acetoacetanilide or its derivatives is quite old. A great many azo combinations have been shown in the literature in this field, and two well-recognized types of yellow pigments have become established in the trade. The first type has been widely known as "toluidine yellows" since the best known member of this series is obtained by coupling a nitrotoluidine (3-nitro-4-amino toluene) with acetoacetanilide. Products in this series generally exhibit fairly good lightfastness but only moderate color strength. The second type of product in this field embodies couplings of tetrazotized derivatives of benzidine (4-4′ diamino diphenyl) coupled with derivatives of acetoacetanilide. These products have become known in the trade as "benzidine yellows." They have been characterized particularly by color strength in the order of at least two times that commonly found in the toluidine yellows but have suffered from the defect of considerably poorer lightfastness. As a consequence of the properties of these two types of products, there has been a constant search for new products which might exhibit the high color strength of the benzidine yellows with the relatively good lightfastness and other desirable properties of the toluidine yellows.

It is an object of this invention to prepare a new azo pigment of high color strength equal to or superior to that of the benzidine yellows together with relatively good lightfastness and generally improved resistance to bleeding in organic solvents. Additional objects will appear hereinafter.

These objects are obtained by the herein described invention wherein a diazotized 5-nitro-2-amino-anisole is coupled with acetoacet-o-anisidide. This new yellow pigment may be obtained by conventional diazotization of the 5-nitro-2-amino-anisole and coupling thereto acetoacet-o-anisidide in the usual manner under slightly acid conditions.

The following example illustrates a preferred embodiment of this invention but it is not intended that the conditions shown therein shall be limiting in themselves. Unless otherwise specified, parts refer to parts by weight.

Example I 168 parts of 5-nitro-2-amino-anisole is slurried in a solution of 79 parts of hydrochloric acid (100%) and 1200 parts of water. This slurry is cooled to approximately 0° C. with ice and, while maintaining the temperature at approximately 0° C., a solution of 71 parts sodium nitrite in 300 parts of water is added over a period of from 12 to 15 minutes followed by a stirring period of about 1 hour whereupon a clear solution of the diazotized amine is formed.

In a separate container, 210 parts of acetoacet-o-anisidide is dissolved in a solution of 80 parts sodium hydroxide in about 8000 parts of water. When a clear solution has been obtained, a solution of 120 parts of acetic acid (100%) diluted with an equal volume of water, is added to the solution to precipitate the acetoacet-o-anisidide in a very finely divided form. At the end of this addition of the acid and a stirring period to reach equilibrium, the pH should be approximately 6.3 and should be adjusted by suitable additions of acid or alkali if significantly different from this value. The volume should be adjusted to about the equivalent of 12,000 parts of water and the temperature adjusted to about 30° C. whereupon the separately prepared diazo is added beneath the surface of the acetoacet-o-anisidide slurry in about 20 minutes. After a further stirring of 15 minutes, the pH should be about 4.6 and may be adjusted if necessary to reach this value. Finally, the slurry of color is heated to the boil and boiled for about 30 minutes, diluted with cold water to bring the temperature down to about 60° C. and then filtered and washed substantially free of soluble salts. After drying at about 60° C. and pulverizing, 360 parts of a brilliant yellow pigment are obtained. It has the following structural formula:

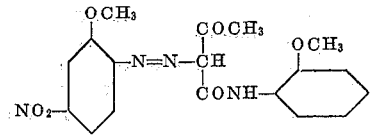

Upon dispersion in a conventional printing ink vehicle and dilution with a dispersion of a white pigment in the same vehicle, the yellow pigment prepared as above exhibits a color strength comparable to that of the conventional benzidine yellows and approximately 2 to 2½ times the strength of the prior art toluidine yellows. The printing ink masstone is darker than most toluidine yellows, the tint is distinctly green and intense and the tendency to bleed in organic solvents is less than that of many toluidine yellows.

Thus, notwithstanding the fact that each of the intermediates of this invention had been used individually in this field before without exhibiting any outstanding characteristics of either color strength or lightfastness, the coupling thereof has resulted in the unique product which combines the desirable properties of the benzidine yellows and the toluidine yellows.

This greatly improved color strength in the new yellow azo pigment was even further quite surprising and unexpected in view of the comparatively poor color strength of closely related pigments. On a visual comparison the color strength of the new pigment was seen to be vastly superior to that of such closely related compounds as the azo combinations of 3-nitro-4-aminotoluene→acetoacetanilide (Color Index #11680); 5-nitro-2-aminoanisole→acetoacetanilide; 5-nitro - 2 - aminoanisole→acetoacet-o-toluidide; 3 - nitro - 4 - aminoanisole→acetoacet - o - anisidide (Color Index #11740); 4-nitro-2-aminotoluene→acetoacet-o-anisidide; and 4-nitro-2-aminoanisole→acetoacet-o-anisidide. In order to measure the degree of this improved color strength the molar extinction coefficients were determined for the new yellow pigment and the azo combination of 3-nitro-4-aminoanisole and acetoacet-o-anisidide, which of the above named prior art pigments showed one of the best color strength. The molar extinction coefficients which are well recognized in the art as a measure of the inherent coloring power of a colored material, are defined as the $$\log \frac{(I_0/I)}{c \times l}$$

where $I_0$ = intensity of incident light
$I$ = intensity of transmitted light
$c$ = concentration in mols per liter
$l$ = thickness of layer and they were determined as follows:

A 0.0126 gm./liter solution of the new yellow azo pigment and a 0.0122 gm./liter solution of the azo combination of 3-nitro-4-aminoanisole and acetoacet-o-anisidide were prepared in chloroform and spectrophotometric curves of the light transmitted through each of these solutions in 1 cm. cells were obtained on a Beckman Spectrophotometer. In order to compensate for the difference in hue of the two product being compared, the percent transmittance of each solution was read from the spectrophotometric curves at the point of maximum absorption. The following determinations were made:

|  | New Azo Pigment | Isomeric Compound |
|---|---|---|
| Conc. in Chloroform _____gm./l__ | 0.0126 | 0.0122 |
| Molecular weight _____ | 386 | 386 |
| Percent transmittance _____ | 6.0 | 25.2 |
| Thickness of layer _____cm__ | 1 | 1 |
| Molar Extinctions Coefficient _____ | 37,436 | 18,952 |

The fact that this particular new yellow pigment showed a two-fold increase in molar extinction coefficient over an isomeric compound was completely unexpected in view of the general comparatively poor color strength of a number of pigments having a structure closely related to both the new product and the isomer tested above.

It is well known that the addition of small amounts of related coupling components to an azo couping frequently alters the color characteristics of the resulting product in a pronounced manner. This coupling is no exception to this common experience, and it is contemplated that small amounts of related components may be added without markedly altering the desirable high strength and good lightfastness of the products of this invention.

The conditions of diazotization are entirely conventional. Since many amines of this types contain appreciable amounts of impurities it is common practice in commercial operations to treat these solutions with absorbents such as carbon black and, possibly a filter aid, followed by a filtration step to remove the diazotized impurities. It is contemplated that such a procedure may be used in this invention and, where used, will frequently result in improved properties due to the removal of these impurities. However, such an operation is not critical to this invention.

In a like manner, the solution of the acetoacet-o-anisidide and its subsequent precipitation with dilute acid to give a slurry which is slightly on the acid side for optimum coupling conditions is well known in the preparation of this type of azo pigments. A slightly acid condition is considered necessary for effective coupling in this series of compounds but, the specific pH is not especially critical and the conditions can be varied materially without altering the novel aspects of this invention.

The product of this invention finds its greatest use in the field of printing inks where its high strength and relatively good lightfastness make it a highly desirable color for use. The intensity and the greenness of tint also commend it to this use. The product is also useful in paper coating operations wherein a paste of the pigment is dispersed in an aqueous coating medium and exhibits strength in the order of 1.5 times that exhibited by the conventional prior art toluidine yellows. It is superior in lightfastness to the prior art toluidine yellows and finds some use in exterior paints. It has excellent properties for use in paint systems intended for interior applications. This includes both the conventional enamels and water based paints in which cases the pigment exhibits its usual high strength and relatively good lightfastness. Although the new pigment exhibits less bleeding in such systems than the prior art toluidine yellows, it is still not free from bleeding and, consequently, must be used with caution whenever paints of different colors are being used at the same time.

Pigments of this type, including the new pigment, are not generally recommended for use in coloring rubber nor in coloring plastics both of which are generally cured at temperatures which may cause sublimation or crystal growth in such products.

I claim as my invention:

As a composition of matter, the compound having the formula

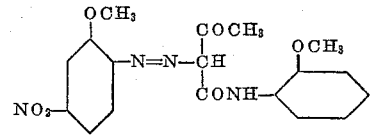

References Cited in the file of this patent
UNITED STATES PATENTS
1,051,565    Desmari _____ Jan. 28, 1913
FOREIGN PATENTS
481,290    Great Britain _____ Mar. 8, 1938